(12) United States Patent
Rozenberg (10) Patent No.: US 6,358,038 B1
(45) Date of Patent: Mar. 19, 2002

(54) INJECTION STRETCH BLOW MOLDING MACHINE

(76) Inventor: Oleg Rozenberg, 2357 E. $19^{th}$ St., $2^{nd}$ Floor, Brooklyn, NY (US) 11229

( * ) Notice: Subject to any disclaimer, the term of this patent is extended or adjusted under 35 U.S.C. 154(b) by 13 days.

(21) Appl. No.: 09/605,959

(22) Filed: Jun. 28, 2000

Related U.S. Application Data

(63) Continuation-in-part of application No. 09/105,756, filed on Jun. 26, 1998, now Pat. No. 6,082,991.

(51) Int. Cl.$^7$ .......................... B29C 49/06; B29C 49/12; B29C 49/32
(52) U.S. Cl. ....................... 425/529; 425/533; 425/534; 425/541
(58) Field of Search ................................ 425/526, 529, 425/535, 534, 541, 537

(56) References Cited

U.S. PATENT DOCUMENTS

| | | | |
|---|---|---|---|
| 2,331,688 A | 10/1943 | Hobson | 264/536 |
| 3,733,162 A | 5/1973 | Farkas | 425/533 |
| 3,784,348 A | 1/1974 | Aoki | 425/534 |
| 3,807,923 A | 4/1974 | Cannon et al. | 425/533 |
| 4,065,246 A | 12/1977 | Marcus | 425/533 |
| 4,364,721 A | 12/1982 | Rainville | 425/533 |
| 4,376,090 A | 3/1983 | Marcus | 264/530 |
| 4,457,688 A | 7/1984 | Calvert et al. | 425/533 |
| 4,512,735 A | 4/1985 | Nilsson et al. | 425/533 |
| 4,604,258 A * | 8/1986 | Valyi | 425/533 |
| 5,501,589 A * | 3/1996 | Marcus | 425/529 |
| 5,874,115 A | 2/1999 | Dobler | 425/533 |

FOREIGN PATENT DOCUMENTS

JP 6-270235 9/1994 ................ 425/522

* cited by examiner

Primary Examiner—Robert Davis
(74) Attorney, Agent, or Firm—Richard M. Goldberg (57) ABSTRACT

An injection stretch blow molding machine utilizing a horizontal clamping arrangement and extruder for manufacture of injection stretch blow-molded articles, includes a stationary machine platen; an injection mold mounted to the stationary machine platen, the injection mold having temperature controlled injection cavities; first and second blow-mold assemblies positioned to opposite sides of the stationary machine platen; a shuttle assembly reciprocally movable along a machine axis of the machine toward and away from the stationary machine platen; a movable platen connected with the shuttle assembly for movement toward and away from the stationary machine platen; a retainer plate mounted to the movable platen; a core mold assembly mounted on the retainer plate, the core mold assembly including core pins; a shuttle plate mounted to the shuttle assembly and reciprocally moving perpendicular to the machine axis, the shuttle plate formed with openings and being in close proximity to the retainer plate in a machine clamp closed position; two slide assemblies mounted on the shuttle plate and movable toward and away from each other, the slide assemblies including neck rings; two stretch rod assemblies mounted on the retainer plate for movement along the machine axis and including stretch rods; and at least one take-off device for removing the blow-molded articles from the machine.

14 Claims, 11 Drawing Sheets

INJECTION STRETCH BLOW MOLDING MACHINE

REFERENCE TO RELATED APPLICATION

This application is a continuation-in-part of U.S. application Ser. No. 09/105,756, filed Jun. 26, 1998 and now U.S. Pat. No. 6,082,991 by the same inventor and entitled INJECTION BLOW MOLDING MACHINE.

BACKGROUND OF THE INVENTION

Injection stretch blow-molding systems are well known in the art. A variety of different sophisticated injection stretch blow-molding machines have been developed through the years.

Most known injection stretch blow-molding machines use a vertical clamp and complicated rotary devices. They are very cumbersome in manufacturing and require very expensive tooling. In addition, they vertically move very heavy weights during opening of the clamp and then have to decelerate with the same weights, during closing of the clamp. The necessity to lift and decelerate free falling heavy weights during clamp opening and closing makes machines with vertical clamps energy inefficient compared to machines with horizontal clamps.

In addition, there is a common trend in the latest machine technology to use all electric machines because of many advantages they have over hydraulic machines. To provide the necessary clamp tonnage all electric machines must use toggle clamps. An injection stretch blow molding machine with horizontal clamps is perfectly suited to be an all electric machine with a toggle clamp. Vertical clamps make it very difficult to adapt the toggle clamp set up, and by that, hinders the ability to mass produce all electric injection stretch blow molding machines. The vertical clamp set up historically started on the assumption that parisons are soft after they are removed from the injection mold and because of this they should be transferred in a vertical position to prevent distortion during transfer from the injection mold to the blow mold. In reality, parisons made in the stretch blow molding process are rapidly cooled in the injection mold to avoid crystallization. Parisons cooled to this condition are rigid enough to be transferred in the horizontal position without being distorted.

A stretch blow-molding machine with a horizontal clamp and shuttle plate moving perpendicular to the machine axis is shown in U.S. Pat. No. 4,376,090. However, this patent does not provide a description of how different parts of this machine are formed and operate, and shows the parison supported by the core pin during its transfer from the injection mold to the blow mold. Moreover, this patent does not have independently operating stretch stations, and stretching of the parisons is performed by closing of the machine clamp. This approach makes it impossible to control the sequence between introduction of blow pressure and mechanical stretching of the parison. It is also difficult in this instance to control the speed with which the mechanical stretching is done, and it is impossible to introduce air before the mechanical stretching begins. The speed of stretching in this patent is tied up with the speed of clamp closing which by itself requires a completely different set of considerations. Injection and blow stations of this invention are sitting on the same platen. In the injection stretch blown molding process, the length of the blown product is much greater then the length of an injected parison. In the set up, described in the above patent, the stack height of the injection mold should be considerable to mach the height of the bottle produced in the blow mold which due to stretching of the parison can be 2.5 to 3 times as long as the initial parison.

SUMMARY OF THE INVENTION

It is an object of this invention to provide an injection stretch blow-molding machine with a horizontal clamp for the purpose of manufacturing injection stretched blow molded products of various sizes and configurations.

It is another object of this invention to provide an injection stretch blow-molding machine where a horizontally positioned parison is being transferred from the injection mold to the blow mold by its neck portion.

It is still another object of this invention to provide an injection stretch blow-molding machine with a new and improved shuttle assembly, moving along the machine axis, and a shuttle plate moving perpendicular to the axis of the machine.

It is yet another object of this invention to provide an injection stretch blow-molding machine with a new and improved core pin assembly formed on the movable platen of an injection-molding machine with a horizontal clamp.

It is a further object of this invention is to provide a new and improved injection stretch blow-molding machine with new and improved blow-mold assemblies positioned next to an immovable platen for the purpose of manufacturing containers of a substantial length, without increasing the daylight of the machine.

It is a still further object of this invention to provide an injection stretch blow molding machine with blow molds formed with a tapered locking device to provide an alignment between the blow mold and the neck ring during clamp closing.

It is a yet further object of this invention to provide a new and improved injection stretch blow-molding machine with new and improved stretch stations formed on the machine movable platen.

It is a yet further object of this invention to provide a new and improved injection stretch blow-molding machine with interchangeable in the machine tooling components.

In accordance with an aspect of the present invention, an injection stretch blow molding machine with an extruder and a horizontally opening clamp is utilized for manufacturing of injection stretch blow molding articles of a different configuration and sizes. The injection stretch blow molding machine includes a stationary machine platen; a movable machine platen which is movable toward and away from the stationary machine platen along a machine axis, to close and open a mold; opposite support structure mounted moveably on machine tie rods; a shuttle assembly mounted between the opposite support structure, for movement along the machine axis, the shuttle assembly including a shuttle plate movable perpendicular to the machine axis; at least one stripper bushing mounted on the shuttle plate for movement therewith, slides movably mounted on the shuttle plate for movement with the shuttle plate and movable toward and away from each other in close proximity to a front surface of the shuttle plate, the slides heaving at least one neck ring; an injection mold with a hot runner manifold mounted on the stationary platen; at least one blow mold assembly with blow mold halves defining blow mold cavities, at least one blow mold assembly fixed relatively to and positioned adjacent to the stationary machine platen; and at least one stretch station fixed relatively to and positioned adjacent to the movable platen including stretch rod adapters for guiding the stretch rods and removing a blown bottle from the blow mold during opening of the machine; a stripper station mounted on the shuttle plate; and at least one stripper bushing fixed on the stripper station, for removing a blown bottle from the stretch rod adapters during clamp opening. Each stretch station includes stretch rods mounted on the plate reciprocally movable along the machine axis formed to stretch the parisons inside the blow cavity in accordance with the sequence of the machine.

Further, there is a retainer plate mounted on movable platen and at least one core pin mounted on the retainer plate; the retainer plate formed with openings to bring temperature controlled liquids to the core pin.

Also, at least one stretch rod adapter is formed on the retainer plate adjacent to the core pin with openings formed in the retainer plate to bring gases through stretch rod adapter to blow the parison into a bottle.

The opposite structure, for supporting the shuttle assembly, is riding on the machine tie rods and made to move with and away from the movable platen along the machine axis, in accordance with the sequence of the machine operation.

In one embodiment, at least one cure station is formed adjacent to the stationary platen and in between the injection mold and blow mold assemblies.

This invention thereby involves injection stretch blow-molding machines, and contemplates forming the machine with a horizontal clamp and shuttle assembly, moving along the tie rods of the machine. The shuttle plate is a part of a shuttle plate assembly and is moving perpendicular to the machine axis during opening of the clamp in accordance to the sequence of machine operation. Two blow mold assemblies are located on both sides of the immovable platen of the machine clamp. An injection mold with a hot runner manifold is formed on the stationary platen of the machine. The injection mold is temperature controlled. Two stretch stations are formed on both sides of the movable platen and equipped with interchangeable in the machine stretch rods. This invention contemplates the injection stretch blow-molding machine having a take-off device formed to remove finished products from the machine.

The invention accordingly is comprised of the features of construction, combination of elements, and arrangements of parts which will be exemplified in the system, device, and article of manufacture hereinafter described and of which the scope of application is as elucidated hereinafter, as will be indicated in the appended claims. In this regard, numerous alternatives within the scope of the present invention, besides those alternatives, preferred embodiments or modes practicing the invention supra, and those to be elucidated, will occur to those skilled in the art.

Others objects, features and advantages of the invention in its details of construction and arrangements of parts will be seen from the above, from the following description of the preferred embodiment when considered with the drawing and from the appended claims. In addition, these and other objects and advantages of the present invention will become evident from the description, which follows.

DESCRIPTION OF THE PREFERRED EMBODIMENTS

Figure 1:
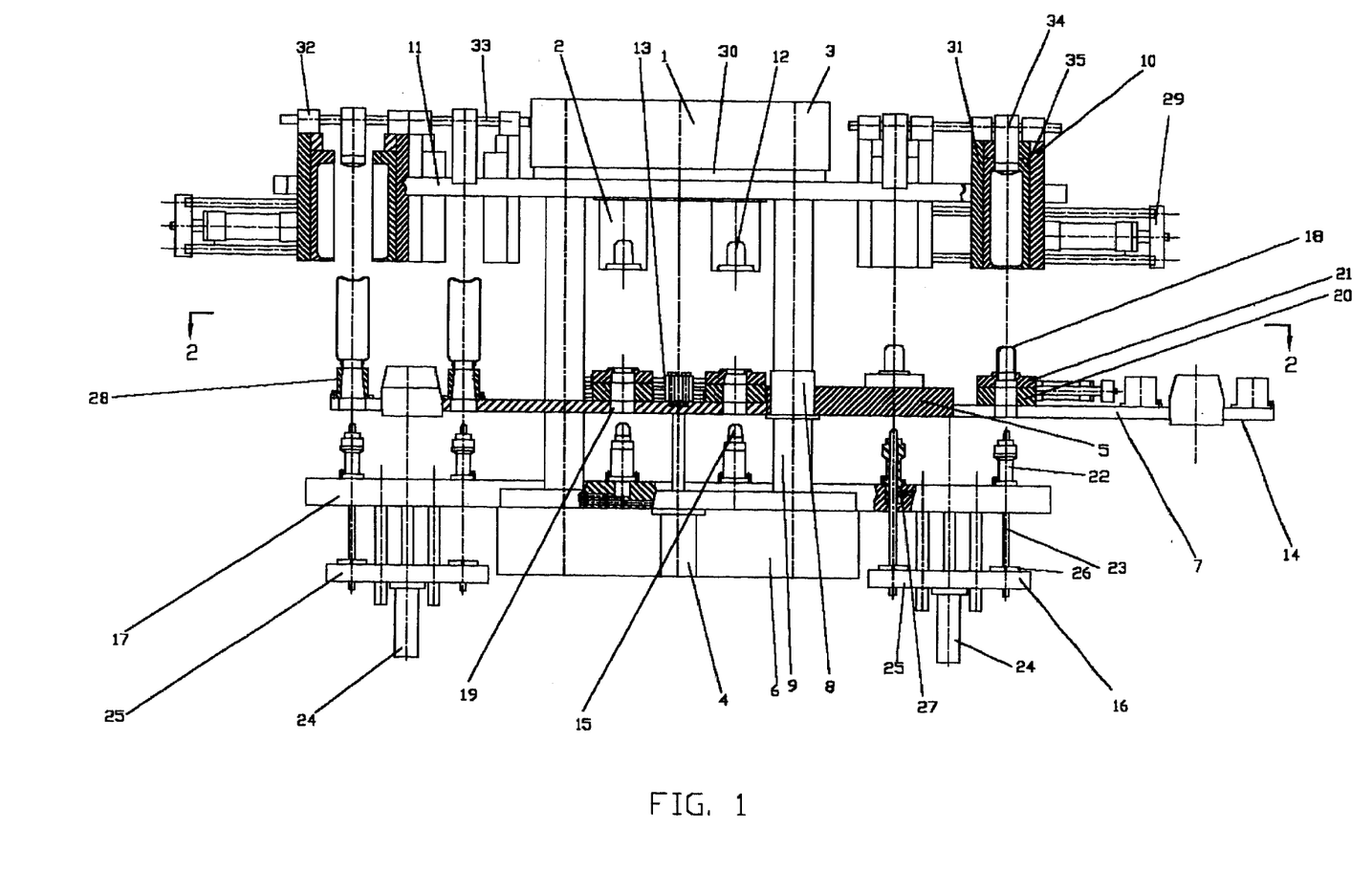
FIG. 1 is a top plan view of an injection stretch blow-molding machine incorporating the instant invention showing the press in the open position, with a take-off system formed to drop the finished bottles down the chute.

With reference to FIG. 1, there is generally shown a top view of an injection stretch blow-molding machine 1 in an open position. Injection stretch blow-molding machine 1 is formed by a number of specially arranged subassemblies. These subassemblies include an injection mold 2, with interchangeable and temperature controlled injection cavities 12, formed on an immovable platen 3. A shuttle plate assembly 5 moves on bushings 8 and tie rods 9, along the machine axis. A shuttle plate 7 is a moving member of the shuttle assembly 5 and shuttles from left to right within the shuttle assembly and perpendicular to the machine axis according to the sequence of machine operations.

Blow stations 10 are formed on both sides of the machine immovable platen 3, between parallel bars 11. Two neck ring assemblies 13 are mounted on shuttle plate 7 in between two take-off stations 14. Stretch rod assemblies 16 are formed along both sides of a movable platen 6 on retainer plate 17. Blow mold assemblies 10 are extended along the side of immovable machine platen 3 to provide room for elongated blow cavities, thus enabling production of long stretched containers from short injection molded parisons, without the need of extended daylight between the movable and stationary platens of the machine.

Injection cavities 12 with neck rings 21 form an outside configuration of an injection-molded parison 18, while core pins 15 mounted on the retainer plate 17 form the inside configuration of the parison 18.

In the position illustrated on FIG. 1, the clamp is opened and is in position ready for closing. During the process of clamp closing, the shuttle assembly 5 and retainer plate 17 will come together first and the front surface of the retainer plate 17 will come into contact with the back surface of shuttle plate 7. After this, closing will proceed with shuttle assembly 5 and movable platen 6 continuing to move together. Core pins 15 will go through the openings 19, formed on the shuttle plate 7, through openings formed in slides 20 and into the neck rings 21 positioned in front of the injection cavities 12. At the same time, stretch rod adapters 22, mounted on the retainer plate 17 on the left side of the core pins 15, will move inside neck rings 21 that are retaining molded parisons 18. The top cylindrical portion of stretch rod adapters 22 will move inside the neck of the molded parisons 18. The stretch rods 23 will be placed inside the parisons. A snug fit between the upper cylindrical portion of the stretch rod adapter 22 and surface inside the parison neck portion will provide a seal needed to trap compressed air inside the parison during blowing of the bottles. After the machine is fully closed and parisons 18 are placed inside blow cavities 35, actuator 24 will retract, moving plate 25 forward along the machine axis. Stretch rods 23 attached to the plate 25 by retainer rings 26 will then move inside parisons 18, mechanically stretching them to the desired length. At the same time, according to the sequence of machine operations, air pressure will be introduced inside the parisons through special openings 27 formed in the retainer plate 17 and a gap between the stretch rods 23 and stretch rod adapters 22.

At the same time, on the other side of the machine, during closing of the press, stretch rod adapters 22 will go through openings formed on shuttle plate 7 and stripper bushings 28, mounted on the shuttle plate 7, and into the necks of already blown bottles. Before the opening of the machine blow molds 35 on this side of the machine, which contain blown bottles, bottles will be snugly fitted around the top portion of the stretch rod adapters 22, to be taken out from the blow molds. During the opening of the press, shuttle assembly 5 and retainer plate 17 with movable platen 6 will move together for some time, with bottles sitting on the stretch rod adapters 22. After the blown bottles are completely cleared from the blow mold, the shuttle assembly 5 will be stopped, while the retainer plate 17 and movable platen 6 will continue to move, taking the stretch rod adapters 22 with them. During this time, bottles will be stripped off the stretch rod adapters 22 by stripper bushings 28 and fall down through the chute to be removed from the machine. Core pins 15 formed in the middle of retainer plate 17 will be withdrawn from the injection-molded parisons and transferred, by shuttle plate 7, in front of one of the blow molds 35. The separation between the shuttle assembly 5 and the retainer plate 17 can be accomplished by several methods known to the industry. Actuators 4 are formed to illustrate one way of moving the shuttle assembly 5 and movable platen 6 away from each other and towards each other during clamp opening and closing. Blow mold actuators 29 are formed to open and close blow molds 35 of blow mold assembly 10 in accordance to the sequence of the machine. Plates 31 retaining blow cavities 35 move on bearings between rails 11 and are supported by bearings 32, which run on rods 33. Blow mold plugs 34 form the bottom of blown bottles.

Figure 2:
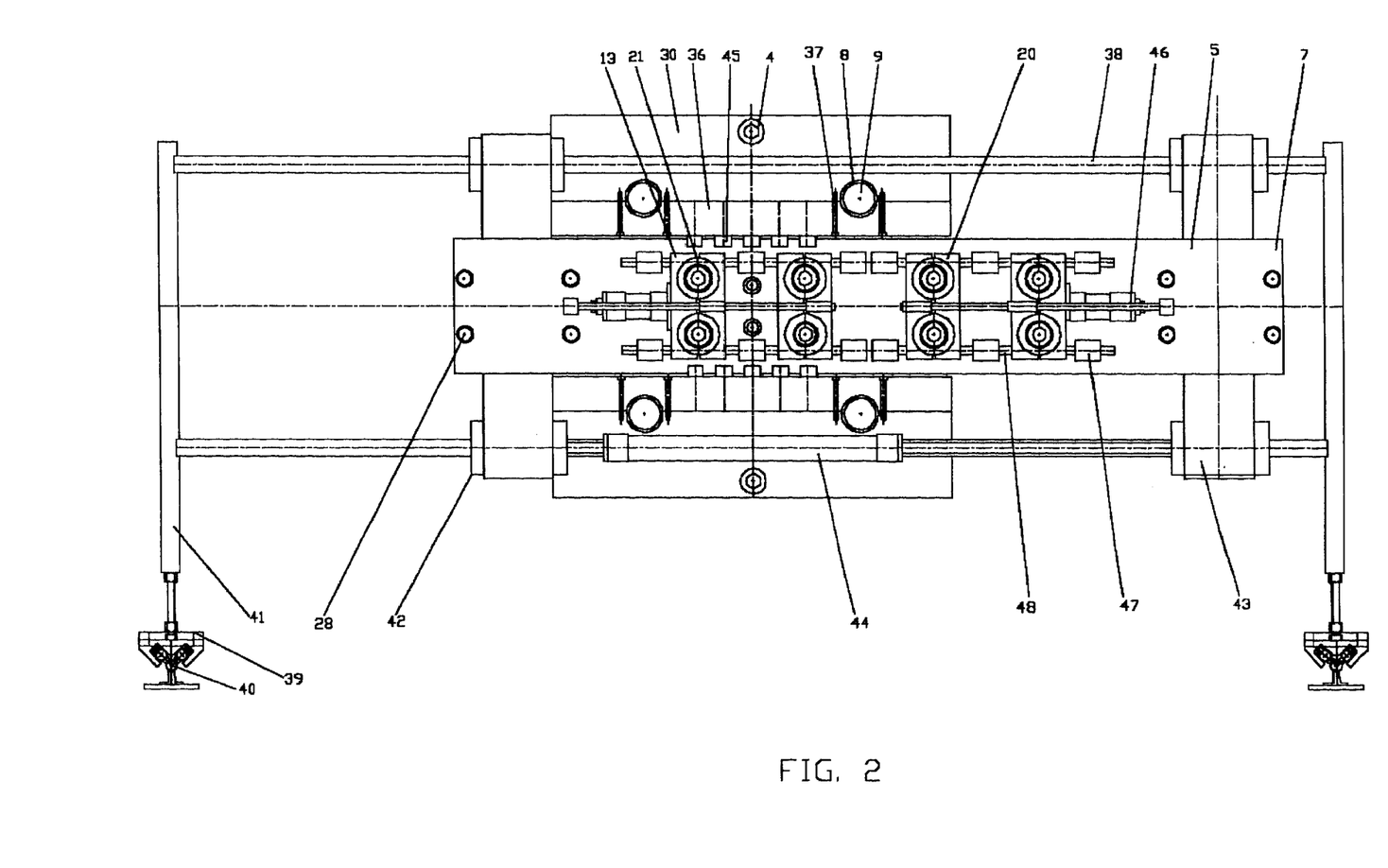
FIG. 2 is a front elevational view of a shuttle plate assembly of the injection stretch blow-molding machine shown along line 2—2 of FIG. 1.

With reference to FIG. 2, there is generally shown a front view of a shuttle plate assembly 5. Shuttle plate assembly 5 is formed by a pair of plates 30 and 36 moving on bushings 8 formed around tie rods 9. Plates 30 and 36 are attached to each other through a number of screws 37. An additional weight support can be provided by bearings 39 riding on rail assemblies 40, formed on the factory's floor and connected through a bars 41 to guide rails 38 of shuttle assembly 5. Shuttle plate 7 is a moving member of a shuttle assembly 5 and moves relative to the assembly. In addition to the movement along the machine axis together with shuttle assembly 5, shuttle plate 7 slides perpendicular to the machine axis on roller assemblies 42, that are riding on guide rails 38. Plates 43 are formed on both ends of shuttle plate 7, to connect the shuttle plate with the set of roller assemblies 42. Device 44 is used to move the shuttle plate 7 along guide rails 38 in according with the sequence of the machine and stop it at a precise location at the end of each stroke. A number of rollers 45 are formed in front and back of shuttle plate 7 to provide an additional support of the shuttle plate 7 during opening of the clamp. A moving device in the form of actuators 4 or other means known to the industry, can be utilized to push, pull and stop shuttle assembly 5 in a precise position along the machine axis, during opening of the clamp.

Moving devices 46 are formed to open and close slides 20 with neck rings 21 in accordance with the machine sequence. A number of blocks 47 are formed on the shuttle plate 7 to mount rods 48 on which neck ring slides 20 of neck ring assembly 13 move towards and away form each other. Stripper bushings 28 are formed on movable plate 7, to the right and left side of neck ring assemblies 13, to strip blown bottles from stretch rod adapters 22 during opening of the machine.

Figure 3:
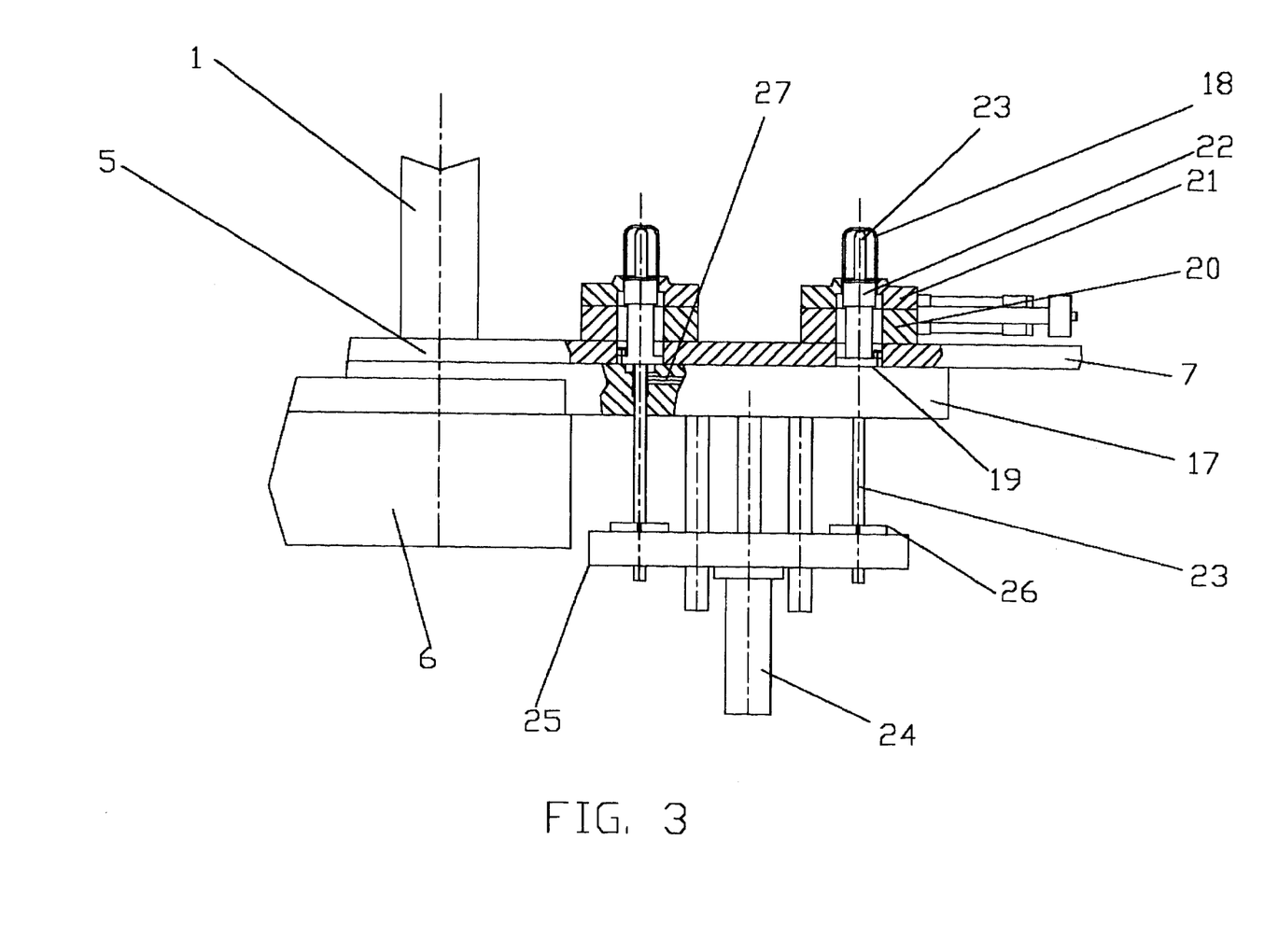
FIG. 3 is a partial cross-sectional view of the left half section of the machine showing a movable platen of the shuttle assembly with neck rings mounted on top of slides in close proximity to the retainer plate mounted on the movable platen.

With reference to FIG. 3, there is generally shown a partial top cross sectional view of injection stretch blow-molding machine 1, in a partially closed position. The shuttle assembly 5 and retainer plate 17 riding on movable platen 6 are pulled together by an actuator. During this stage of the machine sequence, stretch rod adapters 22 pass through openings 19 formed in the shuttle plate 7, openings in the slides 20 and openings formed in the neck rings 21, and are moved inside the neck portions of parisons 18. The parisons 18 are held by neck rings 21 in a horizontal position. Parisons 18 were, during the previous opening of the machine, removed from the injection mold by neck rings 21 and then moved across by the shuttle plate, to be positioned in front of the blow mold. A snug fit between the inner wall of the parison 18 and outer surface of the top portion of the stretch rod adapter 22 will provide a seal and prevent compressed gas from escaping, after it will be introduced inside the parison. The stretch rods 23 supported by the inner surfaces of stretch rod adapters 22 are positioned inside the parisons 18 and are ready to move forward and mechanically stretch the parisons. Actuator 24 of stretch rod assembly 16 is in a fully extended position. As soon as actuator 24 receives a signal in accordance with the machine sequence, it will retract, pushing plate 25 having stretch rod adapters 22 mounted thereon, forward, thereby mechanically stretching parisons 18. Openings 27 are formed in the retainer plate 17 to bring compressed gas through each stretch rod adapter 22 into the blown parison 18.

Figure 4:
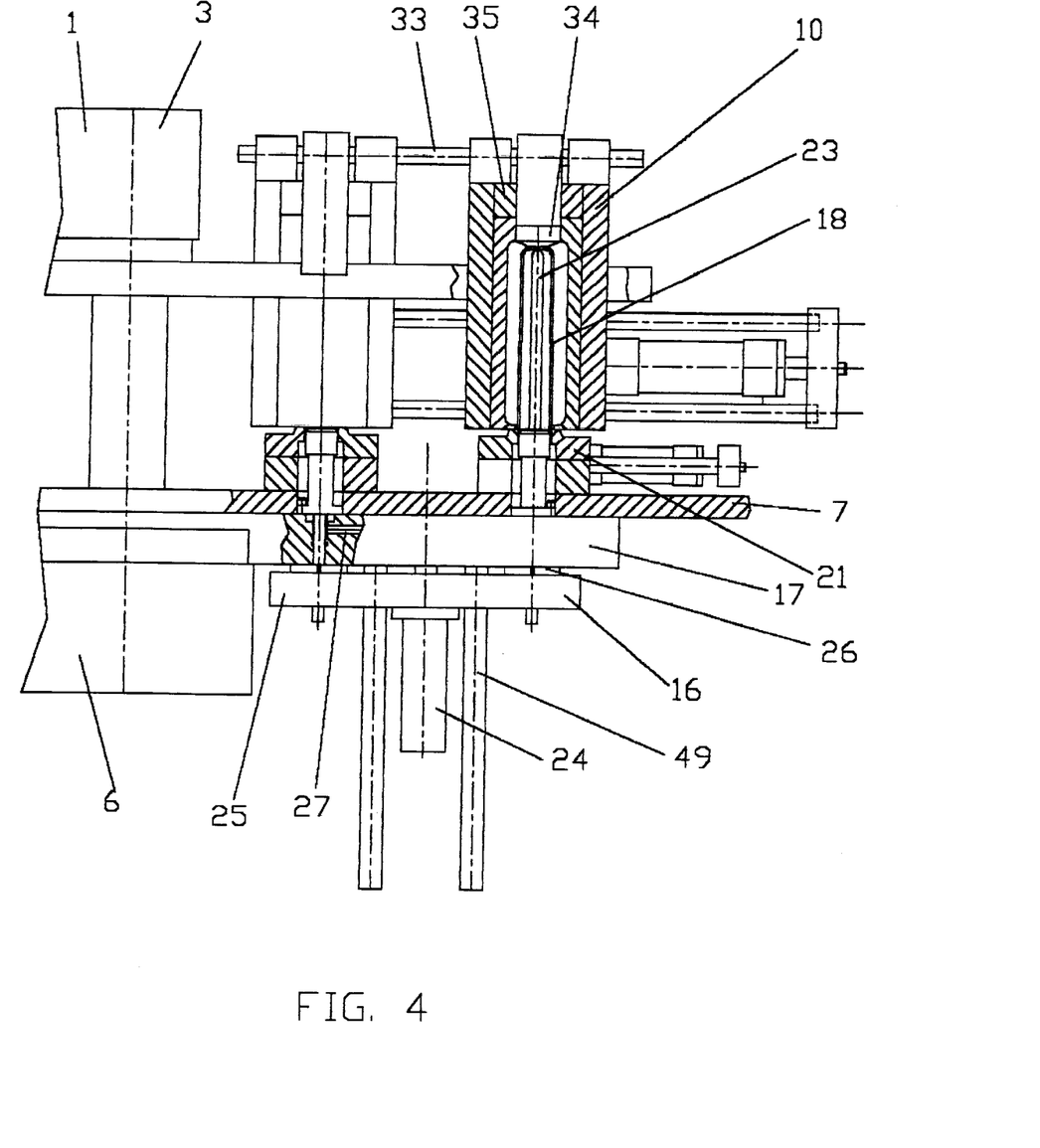
FIG. 4 is a partial cross-sectional view of the left half section of the machine during the stretch-blow molding process in the clamp closed position, showing the shuttle assembly, movable platen and stretch rods assembly with stretch rods extended mechanically inside the parison placed inside the blow mold.

With reference to FIG. 4, there is generally shown a partial top cross sectional view of injection stretch blow-molding machine 1, in a fully closed position. This partial view shows the retainer plate 17, mounted on movable platen 6, positioned in close proximity to the back surface of shuttle plate 7. Neck rings 21 are positioned in close proximity to the front surface of the blow mold cavities 35. The actuator 24 of stretch rod assembly 16 has moved the plate 25 forward, toward the retainer plate 17. Stretch rods 23 that are mounted on the plate 25 that has been moved forward, mechanically stretches parisons 18 inside the blow mold cavity 35. Compressed air is introduced inside the parisons 18 through openings 27 formed in retainer plate 17, and openings formed between the stretch rods 23 and stretch rod adapters 22 to blow the mechanically stretched parisons 18 into a bottle. Guide rods 49 are provided to guide the plate 25 during its movements toward and away from retainer plate 17.

Figure 5:
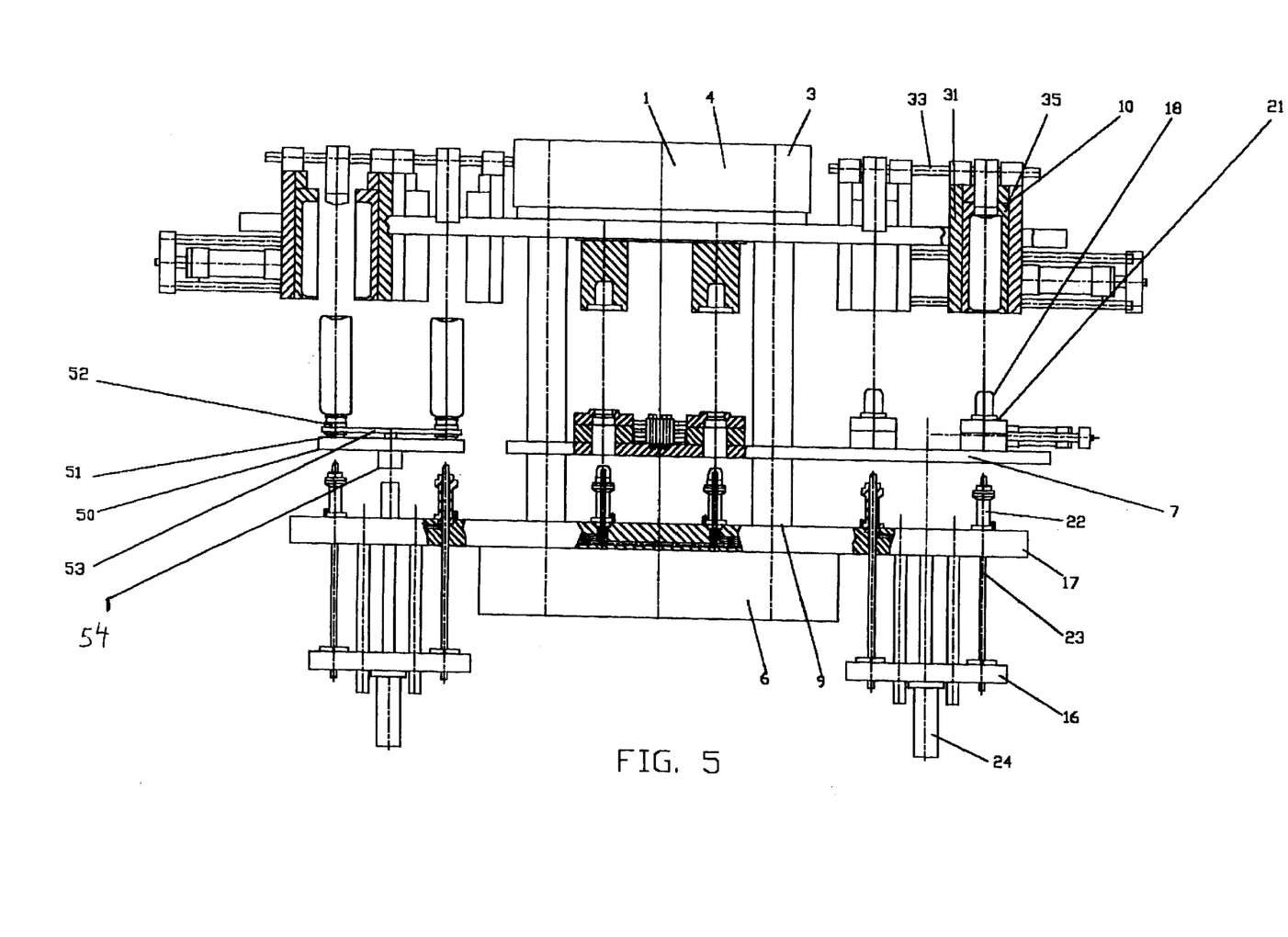
FIG. 5 is a partial cross-sectional view of a modified injection stretch blow-molding machine showing the press in the open position, where a robot is used to remove bottles from the machine.

With reference to FIG. 5, there is generally shown a top view of a modified injection stretch blow-molding machine 1, in an open position. This machine provides a more sophisticated way of removing blown bottles from the machine. In the machine described in FIG. 1, blown bottles where stripped from the stretch rod adapters during the opening of the machine, by using stripper bushings formed on shuttle plate 7 and dropped down the chute placed under the stripping station. If several different shapes and sizes of bottles where manufactured in the machine at the same time, they would have to be unscrambled afterwards. A special robot device, with a robot arm 50 is provided, to remove the blown bottles from the machine shown in FIG. 5. This robot arm will come in during opening of the machine, grab the finished bottles by the necks protruding from the blow molds and remove the bottles from the machine after opening of the blow molds. The robot can then put the bottles in a box or place them in a position needed for further downstream operation. The robot is equipped with pick pins 51 that are moved inside the neck of the bottle to hold the bottles while moving them out of the blow cavities and stripper bushings 52, to strip the bottles off the pick pins after they are removed from the machine. Actuator 54 is formed to move stripper bushing retainer plate 53 with bushings 52 along pick pins 51.

Figure 6:
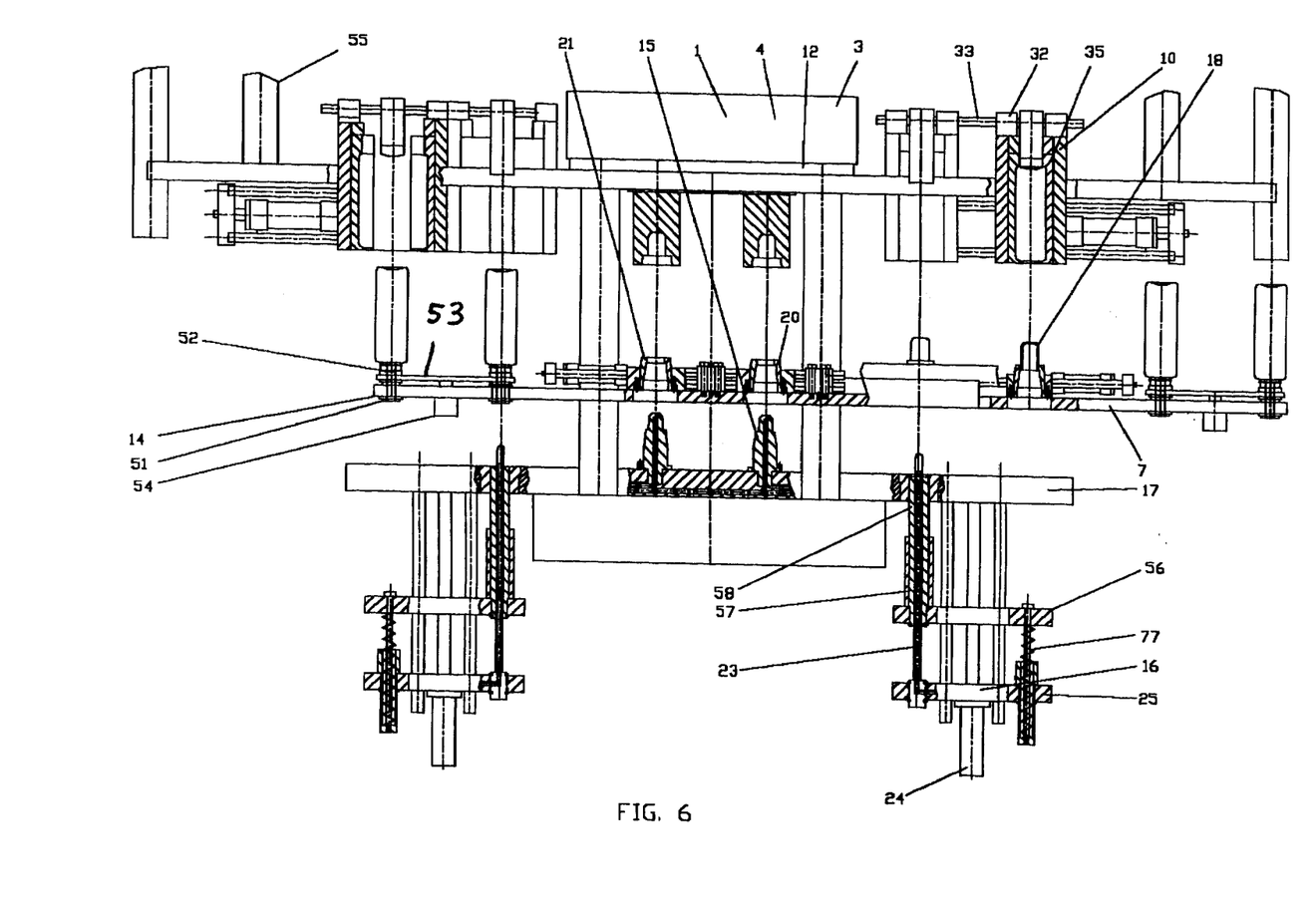
FIG. 6 is a partial cross-sectional view of a further modified injection stretch blow-molding machine in the open position, with a take-of system formed on a shuttle plate and a double plate stretch rod assembly.

With reference to FIG. 6, there is generally shown a top view of a further modified injection stretch blow-molding machine 1, in an open position, where the take off system of this machine and the stretch rod station are formed differently. This take-off system consists of stripper bushings 52 mounted on a stripper plate 53. Stripper bushings 52 are formed around pick-up pins 51 and retained on shuttle plate 7 with retainer rings. A special take away construction 55 is formed to the left and to the right of each blow mold, to take away blown bottles. Shuttle plate 7 is extended away from the centerline to retain pick off stations. Because the pick off stations are mounted on shuttle plate 7 in front of the blow cavities 35, it is impossible to use the stretch rod adapters 22 shown in FIG. 1. During the closing of the machine, the stretch rod adapters, if mounted on the retainer plate 7 will interfere with shuttle plate 7. To prevent this, the stretch rod station 16 is formed differently. This stretch rod station consists of two independently moving plates. Plate 56 is a retainer plate for stop bushings 57 and sealing rods 58. Plate 25 is a retainer plate for stretch rods 23. Actuator 24 is mounted on plate 25, while its rod is attached to the retainer plate 17. During closing of the machine, the actuator 24 of the stretch rod station positioned against the neck ring station, on the left side during the cycle period shown on FIG. 6, will retract, pushing the sealing rods 58 mounted on the retainer plate 56 into the neck of parison 18. This will provide a seal and prevent compressed air from escaping.

After the stop bushing meets the back surface of retainer plate 17, the plate 56 will stop, while plate 25, retaining stretch rods 23 will continue to move forward, collapsing springs 77 and mechanically stretching the parison.

On the right side of the machine, at the same time, the actuator 24 will stay extended and the sealing rods will stay flush with the front surface of the retainer plate 17 not to interfere with the shuttle plate 7.

Figure 7:
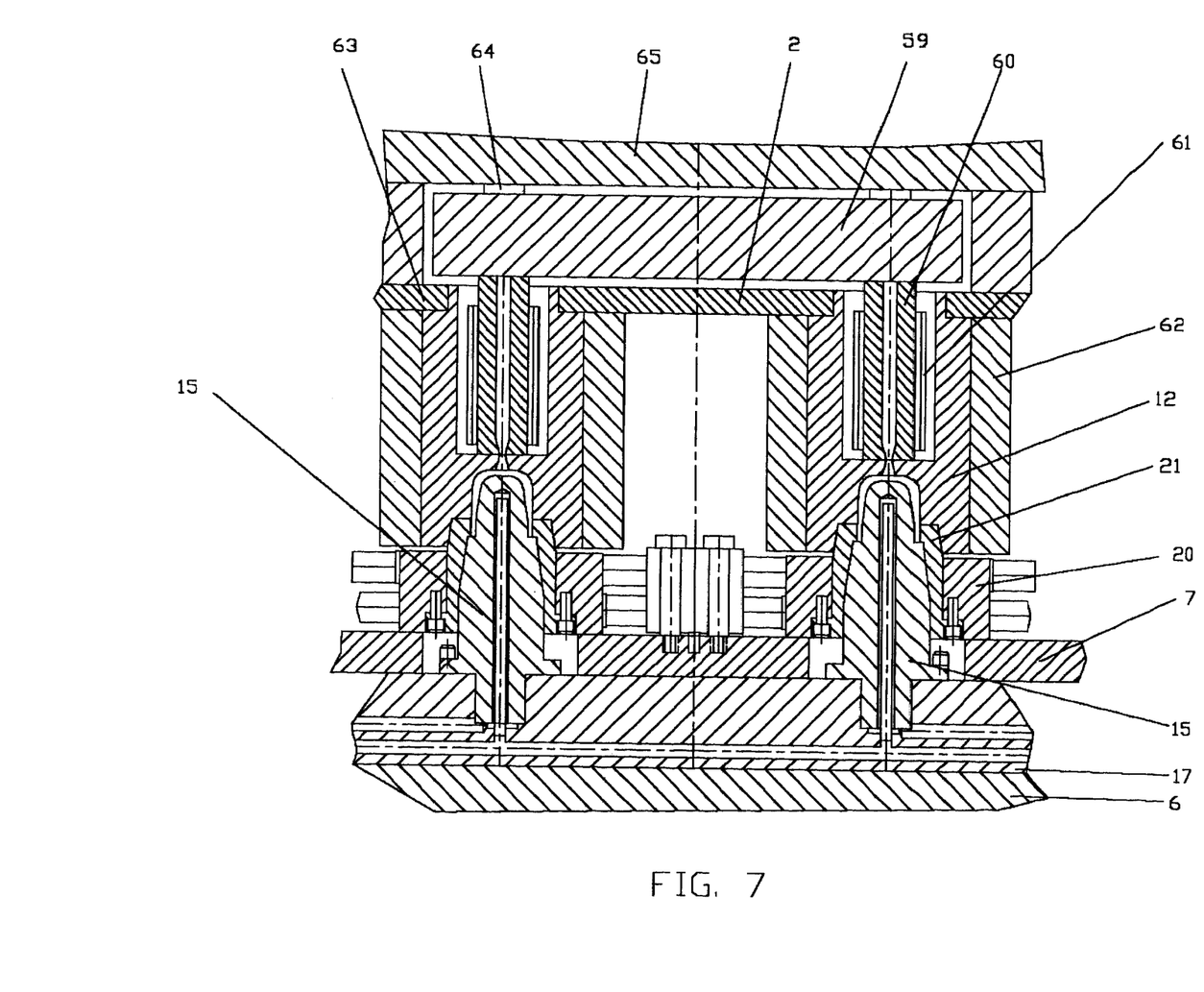
FIG. 7 is a partial cross-sectional view of the middle section of the stretch blow-molding machine showing the injection mold assembly, shuttle assembly with neck rings and movable platen with core pins in the closed position.

With reference to FIG. 7, there is generally shown a top and partial cross sectional view of an injection mold shuttle plate 7 with slides 20, neck rings 21 and core pins 15 mounted on a retainer plate 17 in a closed position. A 5 hot runner manifold 59 is formed to bring melted plastic through a probe 60 with a heater 61 to the injection cavity 12. Water jackets 62 are formed around injection cavities 12 to bring cooling liquids and provide cooling of molded parisons. Retainer plate 63 is formed to locate and retain the injection cavities 12 in the injection mold. Spacers 64 provide heat insulation between hot runner manifold 59 and back plate 65. Core pins 15 are mounted on retainer plate 17. Openings are formed inside the core pin to bring cooling fluids and provide cooling of molded parisons. Neck rings 21 are engaged with the injection cavity 12 through a conical interlock formed between the injection cavity and the conical surface formed on the outer surface of the neck rings. The core pins 15 are engaged with the neck rings 21 through a conical interlock formed between the inner surface of a neck ring and outer conical surface of a core pin, thus insuring uniformity of parison wall thickness.

Figure 8:
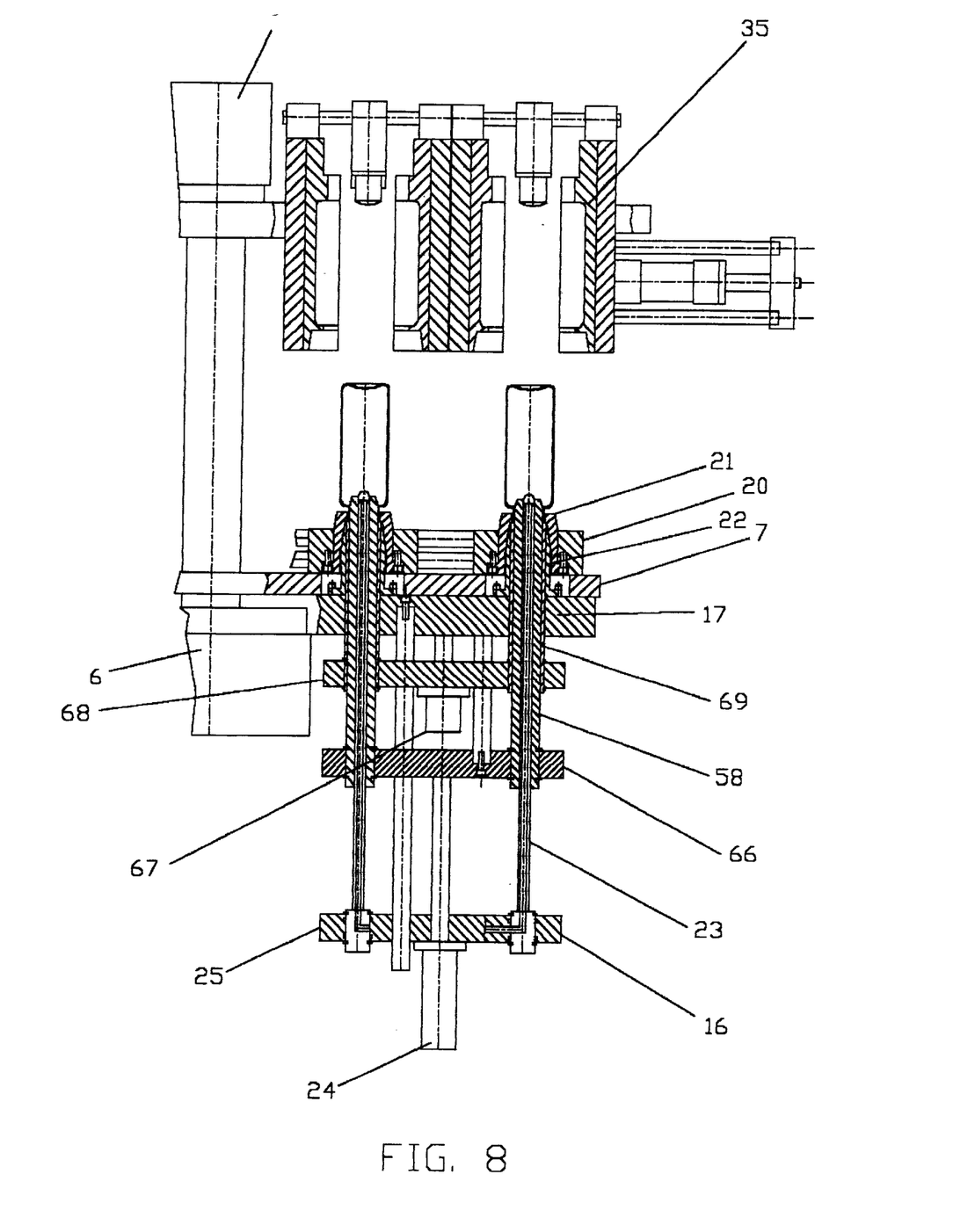
FIG. 8 is a partial cross-sectional view of the left side of a further modified injection stretch blow molding machine in a partially open position, with blow molds formed with conical interlocks and a triple plate stretch rod assembly with stripper bushings and sealing rods.

With reference to FIG. 8, there is generally shown a top and partial cross sectional view of a further modified injection stretch blow-molding machine, incorporating the present invention in a partially open position. However, the stretch rod assembly and the blow cavities shown in FIG. 8 are formed differently. Moreover, the sequence of this machine operation is different from the sequence of the machine shown in FIG. 1. Blow cavities 35 in this embodiment are formed with taper locks to provide better alignment between the blown body of the bottle formed in the blow cavity and the injection molded neck finish of the bottle formed by the neck ring. In the previous embodiments, before the machine opening neck rings placed next to the blow cavity with the blown bottle in it, would open, the bottle would be left in the blow mold. The blown bottles would then be picked up during shuttle plate transfer by a robot or by a pick off device during the next opening, where the blow cavity would open before the clamp opening. Due to taper locks, blow cavities 35 shown in FIG. 8 should open before the clamp opening, and the blown bottles, instead of remaining in the blow cavities until the next opening, are removed from the opened blow cavities by closed neck rings, during machine opening. The sequence of operation of the machine shown in this embodiment is as follows. After the injection-molded parison is placed in front of the blow mold by shuttle plate 7 during its traverse movement perpendicular to the machine axis, the shuttle plate 7 and the retainer plate 17 are moved together by an actuator. At this moment, the sealing rod 58 mounted on immovable plate 66 of stretch rod assembly 16 is moved into the neck portion of molded parison. After the machine is closed, air pressure is introduced inside the parison, actuator 24 of stretch rod assembly 16 retracts, pushing stretch rod 23 inside the parison, mechanically stretching it.

After the finished bottle is formed inside the blow cavity 35, the blow cavity opens, actuator 24 extends, removing the stretch rod adapters from the bottles, and the bottles are taken out of the blow cavities by opening of the clamp. After the clamp is partially opened, before the shuttle plate and retainer plate are separated, neck rings 21 will open. Actuator 67 will retract, pushing stripper bushings 69 mounted on movable plate 68 forward, along sealing rods 58, pushing bottles off sealing rods 58 and dropping them down the chute.

Figure 9:
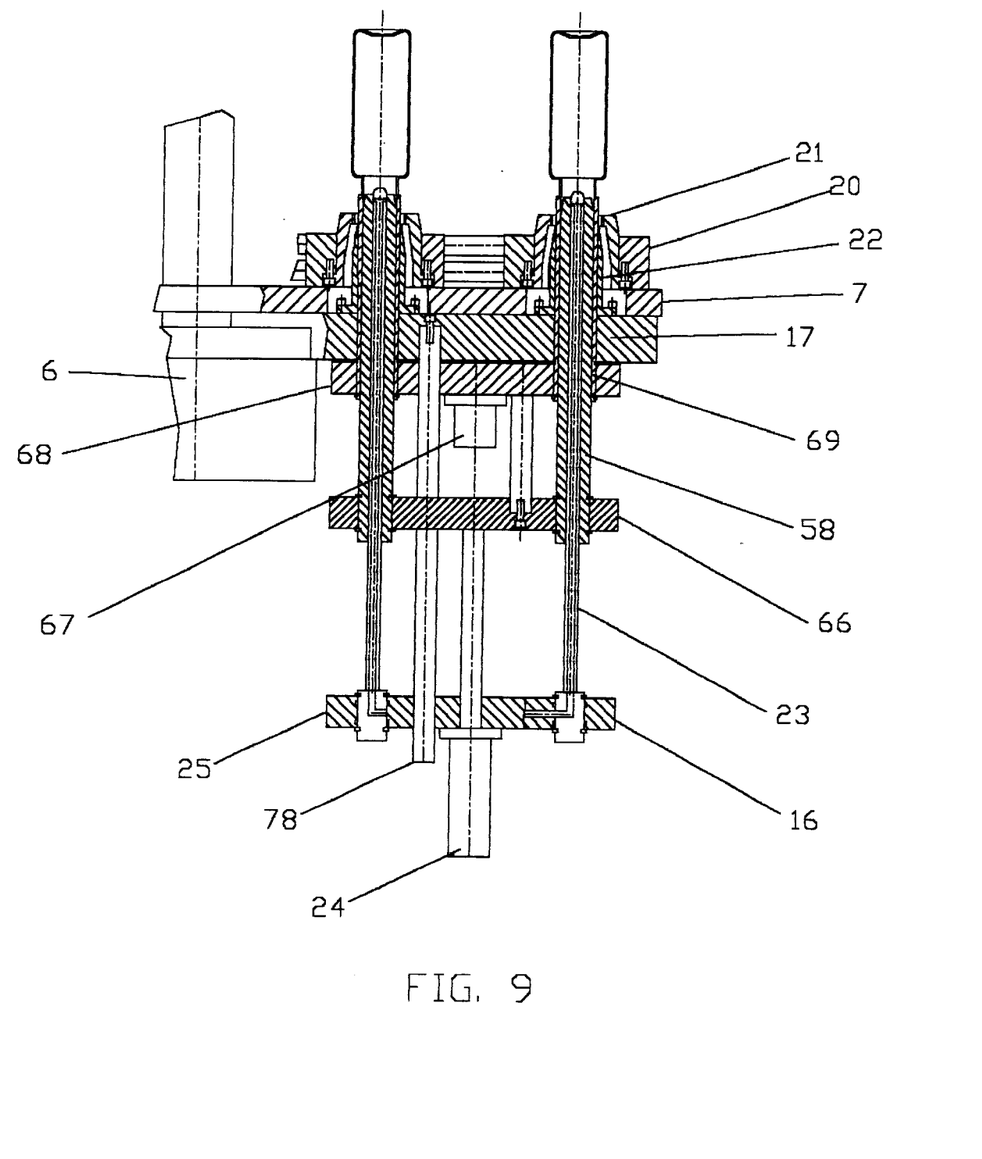
FIG. 9 is a partial cross-sectional view of the left side of a further modified injection stretch blow-molding machine in the fully open position with the slides in the open position and the stripper bushings in the forward position.

With reference to FIG. 9, there is generally shown a partial top view in section of an injection stretch blow-molding machine, incorporating the present invention and described in FIG. 8, but with different sequential movements of machine operation. In the sequential moment shown, neck rings 21 are fully opened, stripper bushing retainer plate 68 moved by the actuator 67 to its front position and stripper bushings 69 pushing the bottles off sealing rods 58 into the chute located underneath. Sealing rods 58 are retained on immovable plate 66 of stretch rod assembly 16. Immovable platen 16 is connected to the retainer plate 17 by rods 78. Actuator 24 is attached to plate 25, while its rod is attached to the immovable plate 66. When the rod of the actuator is retracting, plate 25 moves forward and stretch rods 23 mounted on plate 25 move in the parisons, mechanically stretching them.

Figure 10:
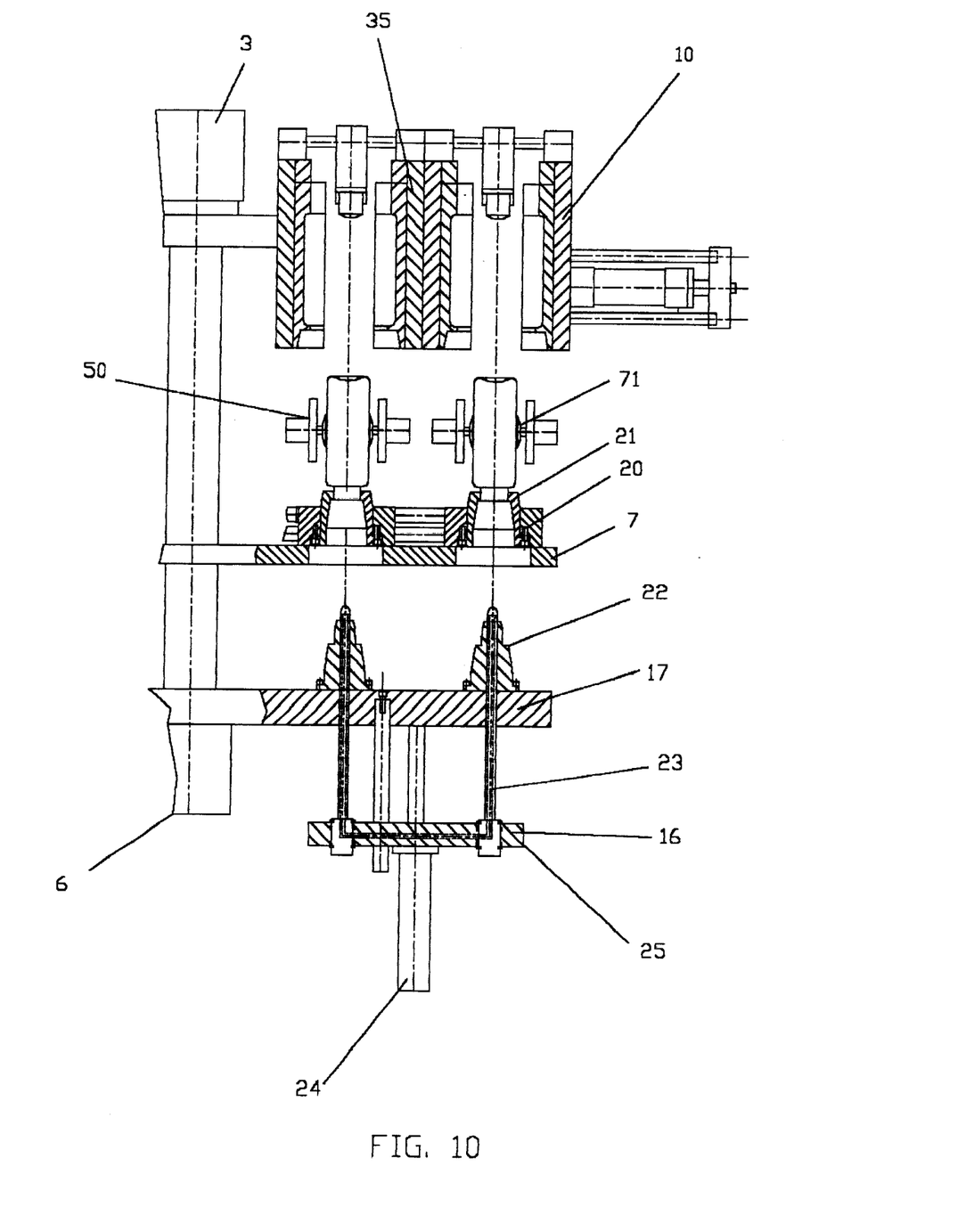
FIG. 10 is a partial cross-sectional view of the left side of an injection stretch blow-molding machine in the open position with the blow molds having a conical interlock and a pick up robot formed to remove bottles from the machine.

With reference to FIG. 10, there is generally shown a partial top view in section of a further modified injection stretch blow-molding machine in an open position, with the blow molds heaving a conical interlock for better alignment, but the stretch rod station formed with a single actuator. This stretch rod station is formed to only stretch the parisons and does not eject the finished product from the machine, as shown in the embodiment described in FIG. 9. Robot 50 with suction cups 71 is employed in this case to remove the finished product from the machine. The sequence of events in this machine is different. During machine closing, parisons molded in the injection mold and transferred by the shuttle plate in front of the blow mold, are inserted by neck rings 21 into the blow cavities 35. During machine closing, a next set of parisons is molded in the injection mold, while at the same time, parisons in the blow cavities are transformed into a finished bottle by compressed air and mechanical stretching by stretch rods 23. Before the clamp will open, the blow cavities will open, so the finished bottles can be taken out of the blow cavities. At first, during clamp opening, the shuttle plate assembly with shuttle plate 7 and retainer plate 17 are moving together, taking the bottles out of the blow cavities. During this time, the bottles are retained by the neck portions between the closed neck rings 21 and stretch rod adapters 22. After the bottles clear the blow molds, the shuttle assembly will stop, while the retainer plate 17 will continue to open, removing stretch rod adapters 22 from the necks of the bottles. During this time, robot 50 will move in, suction cups 71 will grip the bottles, and after neck rings 21 open, the bottles will be taken out of machine by robot 50.

Figure 11:
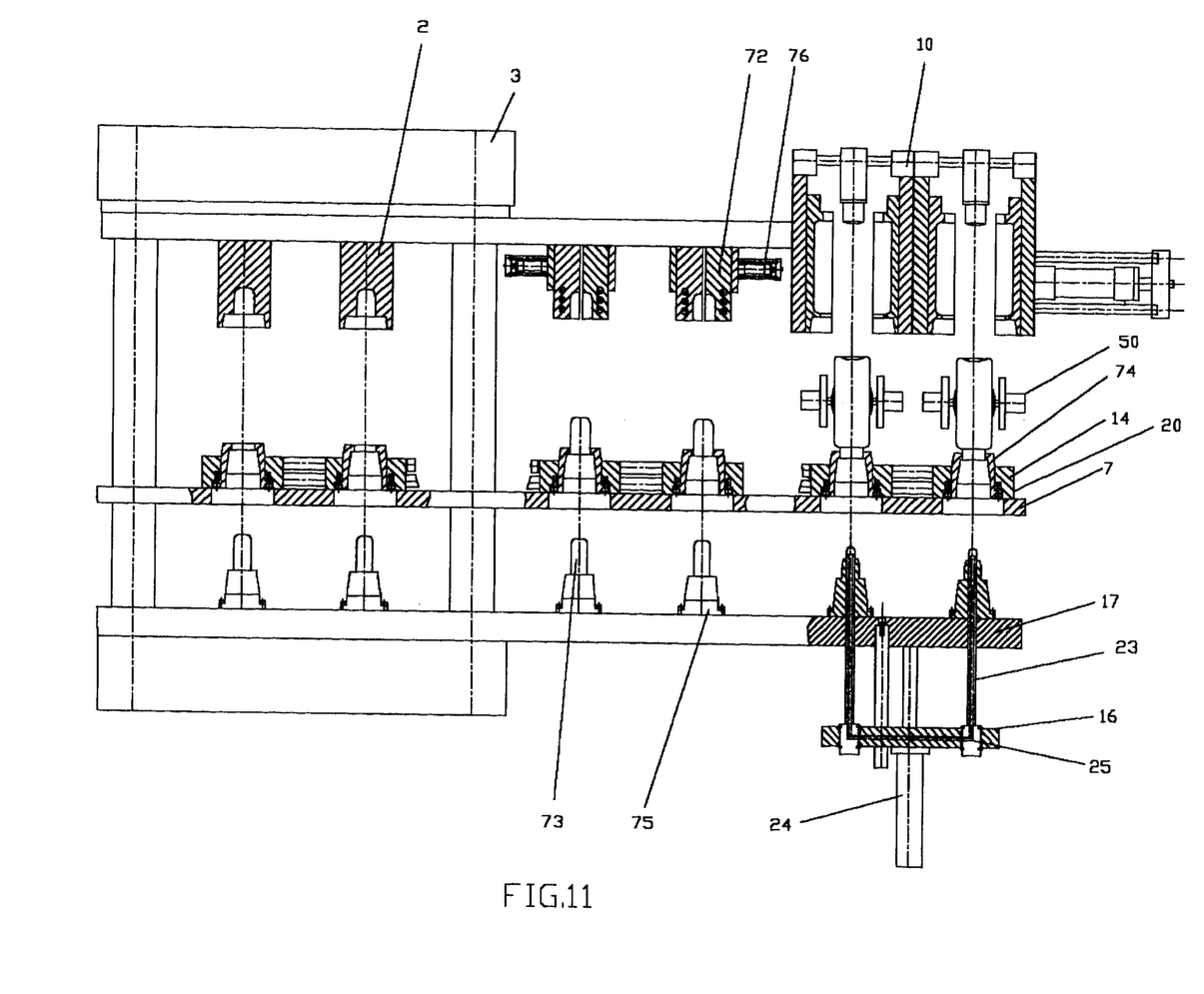
FIG. 11 is a partial cross-sectional view of a further modified injection stretch blow-molding machine in the fully open position with the cure station formed in between the blow mold and the injection mold assemblies.

With reference to FIG. 11, there is generally shown a partial top view in section of a further modified injection stretch blow-molding machine in an open position, incorporating the present invention, where an additional cure station 72 is added between the injection mold assembly 2 and the blow mold assembly 10. Cure station 72 is sometimes needed to produce products having a complicated shape. In the cure station, parisons are reheated with a special heat profile which helps to blow the parison into a shape of a finished product with needed wall distribution. In addition to cure station 72 formed on the immovable platen, an additional core pin station with reheating means, if needed, is provided, with cores pins 73 formed on a retainer plate 17 opposite to the cure station 72. Take off station 14, which is shown in this embodiment, has an additional set of neck rings 74 mounted on slides 20. Neck rings 74 are formed to remove preheated parisons from the cure station and carry them to the blow station. When the take off station is in front of the cure station, neck rings 74 are open. Before clamp opening takes place, neck rings 74 will close around the preheated parison necks and stay closed until the final product is blown and taken out of the blow mold. Robot 50 will be moved in after bottles have cleared the blow cavities, and the shuttle plate assembly is stopped. Then, the robot take out device will take hold of the bottle, while neck rings 74 will open, relieving the bottles, and take the bottles out of the machine. Core pin adapters 75 mount core pins 73 on retainer plate 17. Through openings formed in the retainer plate 17, compressed air can be delivered inside the parison placed in the cure station and pre-blow the parison before they are preheated, into a shape optimal for blowing the final product. This pre-blow will at the same time provide an undercut shape needed to retain the preheated parison in the cure station during clamp opening when the parison is left in the cure station while the re-heating process takes place. Actuator 76 is formed to provide opening and closing of the cure station in accordance with the sequence of the machine to release the preheated parison from the cure station before the next clamp opening.

With the present invention, several major subassemblies are formed to accomplish different tasks and can be assembled and installed in the machine separately, as individual units. The machine provides temperature control of an injection-molded parison during the duration time in the injection mold, and temperature control to cool the finished product in the blow mold. In addition, the machine can be fitted with an intermediate parison conditioning station to provide a certain heat profile during the conditioning of the parison to improve processing of products with complicated profiles. The machine can also be fitted with interchangeable in the machine tooling components to provide efficient manufacturing of small runs with minimal tooling cost or can be set up with multi-cavity molds for efficient manufacturing in mass production.

Various possible embodiments, forms and modifications of the invention, coming within the proper scope and spirit of the appended claims, will, of course, readily suggest themselves to those skilled in the art. Thus, while what have been described are at present considered to be the preferred embodiments of the invention, it will be obvious to those skilled in the art that various changes and modifications may be made therein, without departing from the invention, and it is therefore the aim in the appended claims to cover all such changes and modifications as fall within the true spirit and scope of the invention, and it is understood that, although the preferred form of the invention has been shown, various modifications may be made in the details thereof, without departing from the spirit as comprehended by the following claims.

What is claimed is:

1. An injection stretch blow molding machine utilizing a horizontal clamping arrangement and extruder for manufacture of injection stretch blow-molded articles, comprising:
   a stationary machine platen;
   an injection mold mounted to said stationary machine platen, said injection mold having temperature controlled injection cavities;
   first and second blow-mold assemblies positioned to opposite sides of the stationary machine platen;
   a shuttle assembly reciprocally movable along a machine axis of the machine toward and away from said stationary machine platen;

a movable platen for movement toward and away from said stationary machine platen;

a retainer plate mounted to said movable platen;

a core mold assembly mounted on said retainer plate, said core mold assembly including core pins;

a shuttle plate mounted to said shuttle assembly and reciprocally moving perpendicular to the machine axis, said shuttle plate formed with openings and being in close proximity to said retainer plate in a machine clamp closed position;

two slide assemblies mounted on said shuttle plate and movable toward and away from each other, said slide assemblies including neck rings;

two stretch rod assemblies mounted on said retainer plate for movement along the machine axis and including stretch rods; and at least one take-off device for removing the blow-molded articles from the machine.

2. The machine of claim 1, wherein each said take-off device includes a take off station with at least one stripper bushing mounted on said shuttle plate for stripping a blow-molded article from a respective said stretch rod assembly and for dropping the blow-molded article down a chute during a clamp opening operation.

3. The machine of claim 1, wherein each said core pin mounted on said retainer plate includes a taper shaped base surface to match a taper formed inside a respective said neck ring, so as to form an interlocking connection between the core pin and the neck ring during a clamp closing operation.

4. The machine of claim 1, wherein said neck rings have an outer conical surface and an inner conical surface, said neck rings are mounted to a bottom of the slide assemblies through openings formed in the shuttle plate to provide means of alignment between the neck rings and injection cavities during installation.

5. The machine of claim 1, wherein:

said neck rings having taper locks, and said blow-mold assemblies include blow cavities formed with taper locks to engage with the taper locks formed on the neck rings, such that the blow cavities open before the machine releases the blow-molded article.

6. The machine of claim 1, wherein each stretch rod assembly includes:

a front movable platen, stripper bushings mounted on the front movable platen, a rear movable platen, at least one stretch rod mounted to the rear movable platen, and a stationary platen placed in between the front and rear movable platens and retaining a sealing rod thereon.

7. The machine of claim 1, wherein:

said neck rings retain the blow-molded articles during a clamp opening operation, and said at least one take-off device includes a take out robot which picks the blow-molded articles from the neck rings and takes the blow-molded articles out of the machine.

8. The machine of claim 1, wherein at least one stretch rod adapter is mounted on the retainer plate and has an outer cylindrical surface for fitting inside a neck of a parison and for sealing the neck of the parison during a blowing operation.

9. The machine of claim 1, further comprising a preheat station formed between the injection mold and the blow-mold assemblies to cure parisons to be blown into products at the blow-mold assemblies.

10. The machine of claim 9, wherein the parisons are pre-blown in the preheat station, prior to being heated at said preheat station.

11. The machine of claim 9, wherein the preheat station includes:

two halves movable toward and away from each other, and an actuator for moving the two halves toward and away from each other so as to release the pre-blown parison from the preheat station.

12. The machine of claim 1, further comprising:

a support rail for the shuttle assembly, formed on a factory floor in a direction parallel to the machine axis, and an extension from the shuttle assembly with a bearing block rides on said support rail.

13. The machine of claim 1, wherein said at least one take-off device includes robots for removing said blow-molded articles from the machine.

14. The machine of claim 1, wherein:

said blow-mold assemblies include blow cavities;

each stretch rod assembly includes at least one stretch rod; and said injection mold, core pins, neck rings, stretch rods and blow cavities are interchangeable inside the machine.

* * * * *